(12) United States Patent
Taniguchi et al.

(10) Patent No.: US 9,564,179 B2
(45) Date of Patent: Feb. 7, 2017

(54) RECTIFYING COMPONENT FOR MAGNETIC DISK DEVICE

(71) Applicant: TDK CORPORATION, Tokyo (JP)

(72) Inventors: Susumu Taniguchi, Tokyo (JP); Hisayuki Abe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/089,801

(22) Filed: Apr. 4, 2016

(65) Prior Publication Data

US 2016/0293226 A1 Oct. 6, 2016

(30) Foreign Application Priority Data

Apr. 6, 2015 (JP) ................................. 2015-077831

(51) Int. Cl.
*G11B 17/00* (2006.01)
*G11B 33/14* (2006.01)

(52) U.S. Cl.
CPC ........... *G11B 33/1426* (2013.01); *G11B 17/00* (2013.01); *G11B 33/1446* (2013.01)

(58) Field of Classification Search
CPC ......... G11B 17/00; G11B 17/02; G11B 17/04; G11B 33/02; G11B 33/14
USPC ..................... 360/97.12–97.17, 97.02, 97.01
See application file for complete search history.

(56) References Cited

U.S. PATENT DOCUMENTS

2010/0134920 A1* 6/2010 Mizumoto ........... G11B 33/148
360/97.14

FOREIGN PATENT DOCUMENTS

| JP | 2008-090874 A | 4/2008 |
| JP | 2010-134988 A | 6/2010 |

* cited by examiner

*Primary Examiner* — Allen T Cao
(74) *Attorney, Agent, or Firm* — Oliff PLC

(57) ABSTRACT

A spoiler (40) that is a rectifying component for a magnetic disk device including a flat plate-like plate portion (41) arranged to face a magnetic disk (10), and a support portion (42) that supports the plate portion (41) includes a body portion (401) made of a resin, and a metal plating layer (402) that covers an entire surface of the body portion (401).

5 Claims, 7 Drawing Sheets

RECTIFYING COMPONENT FOR MAGNETIC DISK DEVICE

TECHNICAL FIELD

The present invention relates to a rectifying component for a magnetic disk device.

BACKGROUND

In a magnetic disk device in which a plurality of magnetic disks in which a magnetic recording layer is formed on a circular plate are rotated, and writing of information to the magnetic recording layer of the magnetic disk and reading of the information from the magnetic recording layer are performed using a magnetic head, vibration of the magnetic disk by an air flow generated due to the rotation of the magnetic disk (flutter phenomenon) becomes a problem. Therefore, a rectifying component for adjusting an air flow on the magnetic disk is used. As the rectifying component, a rectifying component made of a metal has been conventionally used. However, a rectifying component made of a resin is being studied in consideration of a high cost of the rectifying component made of a metal and a concern about generation of metal contaminants (for example, Japanese Unexamined Patent Publication No. 2008-90874). The rectifying component made of a resin is superior to a rectifying component made of a metal in that the rectifying component made of a resin is allowed to be processed with high precision at low cost and metal contaminants are not generated.

SUMMARY

However, in the magnetic disk device including a rectifying component made of a resin, the following problems are likely to be generated. That is, since the rectifying component made of a resin is positively charged, dust (particles) charged with positive charge in the magnetic disk device is easily adhered to the magnetic disk charged with negative induction charge. If the particles are adhered to the magnetic disk, the magnetic disk or the magnetic head is likely to be damaged.

The present invention has been made in view of the above circumstances, and an object thereof is to provide a rectifying component for a magnetic disk device capable of suppressing the adhesion of particles to a magnetic disk.

To achieve the above object, a rectifying component for a magnetic disk device according to an embodiment of the present invention is a rectifying component for a magnetic disk device including a flat plate-like plate portion arranged to face a magnetic disk, and a support portion that supports the plate portion, and includes a body portion made of a resin; and a metal plating layer that covers an entire surface of the body portion.

In the rectifying component for a magnetic disk device, the entire surface in the body portion made of a resin is covered with the metal plating layer. Therefore, since surface resistance of the rectifying component can be reduced, it is possible to prevent the magnetic disk that the plate portion faces from being charged with negative induction charge. Accordingly, it is possible to suppress adhesion of particles to the magnetic disk.

Here, when a length of a surface of the body portion in a cross sectional image is A and a length of a straight line connecting end portions of the surface of the body portion in the cross sectional image is L, A/L may be 1.35 to 7.10.

Since A/L is in the above range, surface resistance in the rectifying component for the magnetic disk device is reduced, and adhesiveness between the body portion and the metal plating layer is improved. Accordingly, it is possible to prevent, for example, peeling of the metal plating layer from occurring when the rectifying component is attached to the magnetic disk device.

Further, a thickness of the metal plating layer may be 0.4 µm to 10.2 µm.

Since the thickness of the metal plating layer is in the above range, the surface resistance in the rectifying component for a magnetic disk device can be stably reduced. Accordingly, it is possible to enhance an effect of suppression of adhesion of particles to the magnetic disk.

Here, hardness of the metal plating layer may be 300 HV to 800 HV.

Since the hardness of the metal plating layer is in the above range, adhesion to the body portion is improved, and durability of the rectifying component for a magnetic disk device is improved.

The body portion may include a filler, and the filler may be exposed to an interface between the body portion and the metal plating layer.

Since the body portion includes the filler, strength thereof is improved. Further, since the filler is exposed to the interface between the surface of the body portion and the metal plating layer, the metal plating layer more easily enters a gap between irregularities of the surface of the body portion, and the adhesiveness between the body portion and the metal plating layer is improved.

The metal plating layer is formed using an electroless plating method.

Since the metal plating layer is formed using the electroless plating method, it is possible to easily form the metal plating layer on the entire surface regardless of a shape of the body portion. Further, since control of the thickness of the metal plating layer can be easily performed, it is possible to obtain a high-accuracy rectifying component capable of preventing particles from adhering to the magnetic disk.

According to the present invention, the rectifying component for a magnetic disk device capable of suppressing adhesion of particles to the magnetic disk is provided.

DETAILED DESCRIPTION

Hereinafter, embodiments of the present invention will be described in detail with reference to the accompanying drawings. The same elements are denoted with the same reference signs in description of the drawings, and repeated description will be omitted.

Figure 1:
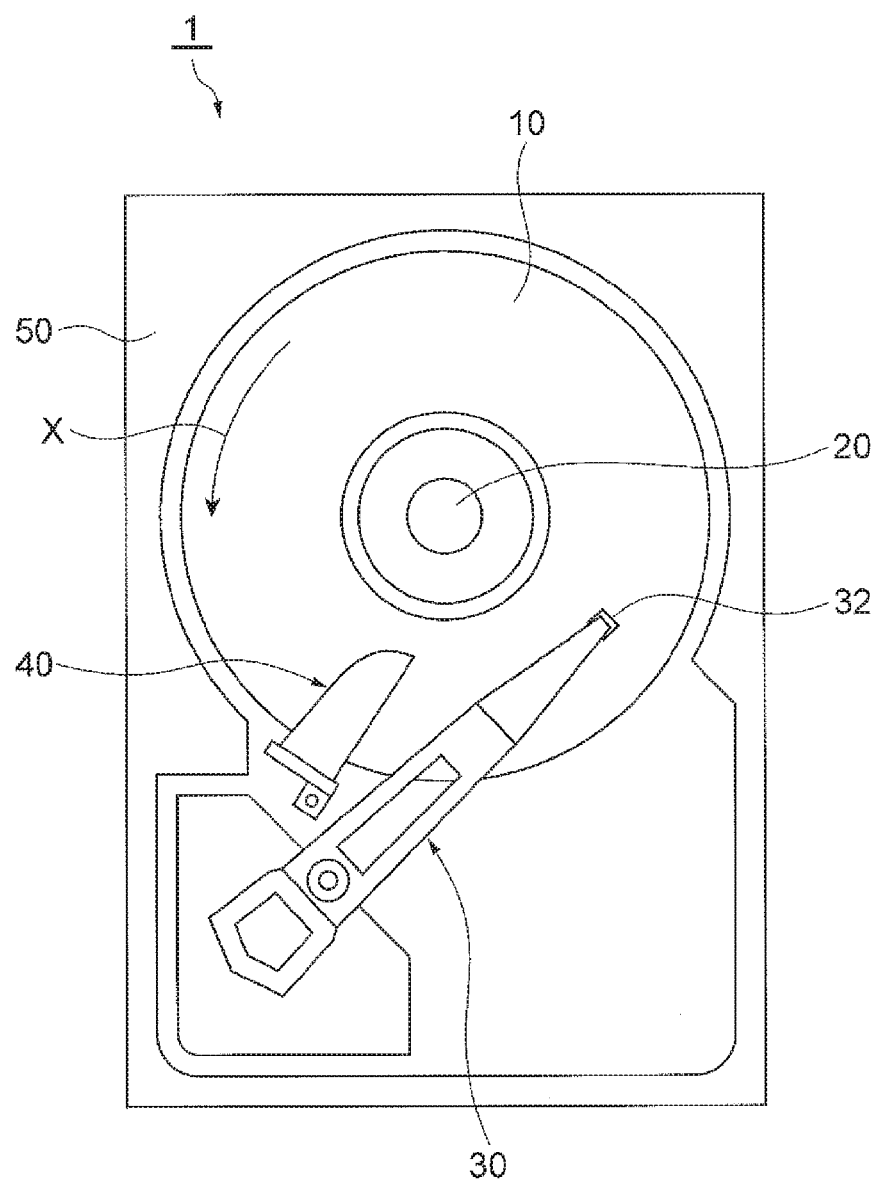
FIG. 1 is a schematic configuration diagram of a magnetic disk device according to an embodiment of the present invention.

FIG. 1 is a schematic configuration diagram of a magnetic disk device 1 including a rectifying component for a magnetic disk device according to an embodiment of the present invention. The magnetic disk device 1 (HDD) includes a plurality of magnetic disks 10 which are recording portions, a spindle motor 20 that rotates the magnetic disks 10, a head stack assembly (HSA) 30 including a magnetic head 32 facing a magnetic recording layer formed on a main surface of the magnetic disk 10, and a spoiler 40 (disk spoiler) that is a rectifying component for a magnetic disk device that rectifies an air flow generated due to the rotation of the plurality of magnetic disks 10. These components are accommodated in a housing 50 and used in a state in which an upper portion of the housing 50 is covered with a cover 52 (see FIG. 3).

The plurality of magnetic disks 10 are fixed to a cylindrical portion of the spindle motor 20 in a state in which the magnetic disks 10 are spaced apart from each other. Although a case in which three magnetic disks are provided will be described in this embodiment, the number thereof can be appropriately changed.

The spindle motor 20 includes a motor which is a driving source, and a spindle to which the plurality of magnetic disks 10 are attached. The spindle is rotated by driving of the driving source to rotate the plurality of magnetic disks 10.

The magnetic head 32 of the HSA 30 can be moved parallel to the surface of the magnetic recording layer formed on the main surface of the magnetic disk 10 by an arm 34. The magnetic head 32 faces and floats on the magnetic recording layer of the rotating magnetic disk 10 to perform recording of information and perform reading of the information from the magnetic recording layer. Further, the spoiler 40 is a rectifying component that is attached to the housing 50 and partially inserted between the plurality of magnetic disks 10, and that has a function of rectifying an air flow generated due to the rotation of the magnetic disk 10. The spoiler 40 is provided in a position on the upstream side of the magnetic head 32 when the magnetic disk 10 rotates counterclockwise (X direction in FIG. 1).

Figure 2:
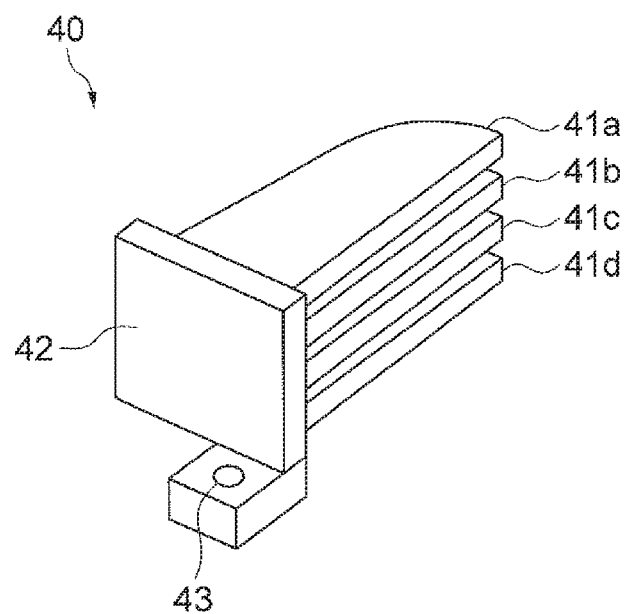
FIG. 2 is a schematic perspective view illustrating a configuration of a spoiler.
Figure 3:
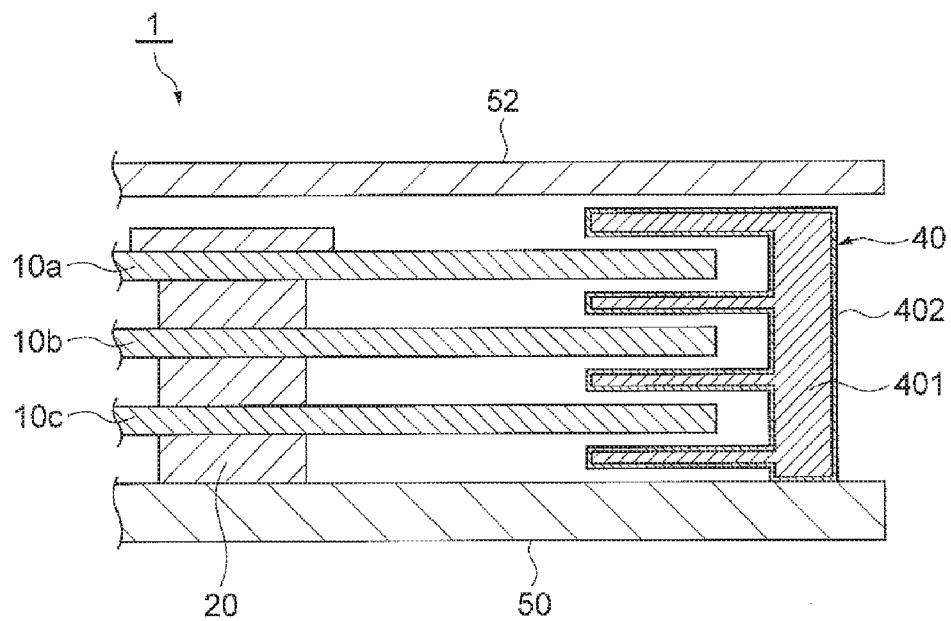
FIG. 3 is a schematic cross sectional view illustrating an arrangement when a spoiler is attached to the magnetic disk device.

FIG. 2 is a schematic perspective view illustrating a structure of the spoiler 40. FIG. 3 is a schematic cross sectional view illustrating an arrangement when the spoiler 40 is attached to the magnetic disk device 1. As illustrated in FIGS. 2 and 3, the spoiler 40 includes a plurality of plate portions 41a to 41d, and a support portion 42 that supports the plate portions 41a to 41d.

The plate portions 41a to 41d are flat plate-like members, respectively, and are attached to the support portion 42 in a state in which the plate portions 41a to 41d are parallel to and spaced apart from each other. A through hole 43 for screwing is provided at a lower end portion in the support portion 42.

The spoiler 40 includes a body portion 401 made of a resin, and a metal plating layer 402 that covers an entire surface of the body portion 401. That is, an entire surface of the spoiler 40 is formed of the metal plating layer 402. If the through hole 43 is formed in the spoiler 40, the "entire surface" also includes an inner wall of the through hole 43. The body portion 401 and the metal plating layer 402 of the spoiler 40 will be described below.

In the spoiler 40, when the magnetic disk device 1 is assembled, magnetic disks 10a to 10c are inserted between the adjacent plate portions 41a to 41d. Specifically, after the magnetic disks 10a to 10c are mounted on the spindle motor 20, the spoiler 40 is arranged on the housing 50, and a screw is inserted into the through hole 43 for temporary fixing. Then, the spoiler 40 is rotated about the screw to a position in which the plate portions 41a to 41d overlap the magnetic disks 10a to 10c, and then, the screw is fixed. In the magnetic disk device 1 of this embodiment, the magnetic disk 10a is inserted between the plate portions 41a and 41b, as illustrated in FIG. 3. Similarly, the magnetic disk 10b is inserted between the plate portions 41b and 41c, and the magnetic disk 10c is inserted between the plate portions 41c and 41d. Accordingly, a main surface of at least one of the plate portions 41a to 41d is arranged to face a main surface of any one of the magnetic disks 10a to 10c.

Next, an internal structure of the spoiler 40 will be described. The spoiler 40 includes the body portion 401 made of a resin, and the metal plating layer 402 that covers the entire surface of the body portion 401. That is, an entire surface of the spoiler 40 is famed of the metal plating layer 402. When the through hole 43 is formed in the spoiler 40, the "entire surface" also includes an inner wall of the through hole 43.

The spoiler 40 according to this embodiment has a smaller surface resistance than a spoiler made of a resin in the related art. When the surface resistance of the spoiler 40 is small, it is possible to prevent the surface of the spoiler 40 from being charged with positive charge. Accordingly, it is possible to prevent the magnetic disk 10 from being charged with negative induction charge. As a result, it is possible to prevent dust (particles) charged with positive charge from adhering to the magnetic disk 10 in the magnetic disk device 1. Hereinafter, an internal structure for realizing the spoiler 40 having the small surface resistance, and a method of manufacturing the spoiler 40 will be described.

A resin is used for the body portion 401 of the spoiler 40 since the resin is able to be processed with high precision dimension and is inexpensive. "made of a resin" in this embodiment refers to the fact that a percentage of the resin relative to a total weight of the body portion 401 is 10 wt % or more. Further, when the body portion 401 "is made of a resin", a percentage of the resin relative to a total volume in the body portion 401 is 30 vol % or more. Examples of the resin forming the body portion 401 may include resins having heat resistance and a high coefficient of elasticity, which include thermoplastic resins such as a polyimide resin or a polycarbonate resin, and a material obtained by blending a filler such as a reinforcing fiber with such a resin. In particular, since the polyimide resin or the polycarbonate resin is able to be subjected to an injection molding process and is a resin having a high modulus of elasticity, the polyimide resin or the polycarbonate resin is suitably used as the body portion 401. By forming the body portion 401 through the injection molding process, it is possible to realize molding with a high precision dimension.

The filler may be blended with the body portion 401 to strengthen the body portion 401. For example, a carbon fiber or a glass fiber can be suitably used as the filler. By blending the filler with the body portion 401, it is possible to suitably increase the strength of the body portion 401. If the body portion 401 contains the filler, an amount of the filler can be appropriately set based on, for example, a type of the filler and the resin constituting the body portion 401.

A nickel plating layer, a copper plating layer, or the like may be adopted as the metal plating layer 402. A thickness of the metal plating layer 402 is preferably 0.4 µm to 10.2 µm. When the thickness of the metal plating layer 402 is 0.4 µm or more, it is possible to decrease the surface resistance of the spoiler 40. Further, if the thickness of the metal plating layer 402 is 10.2 μm or less, adhesion to the body portion 401 is improved. The thickness of the metal plating layer 402 can be measured by, for example, a fluorescent X-ray analysis apparatus.

Further, it is preferable for the metal plating layer 402 to have a hardness of 300 HV to 800 HV. By the hardness being in the above range, the adhesion to the body portion 401 is improved, and durability of the spoiler 40 is also improved. Here, the hardness is Vickers hardness. If the metal plating layer 402 is a nickel-phosphorous layer or a nickel-boron layer, an improvement effect of the adhesion to the body portion 401 becomes particularly great in the above hardness range. From the viewpoint of the adhesion improvement and the durability improvement, it is more preferable for the hardness to be 400 HV to 800 HV.

Figure 4:
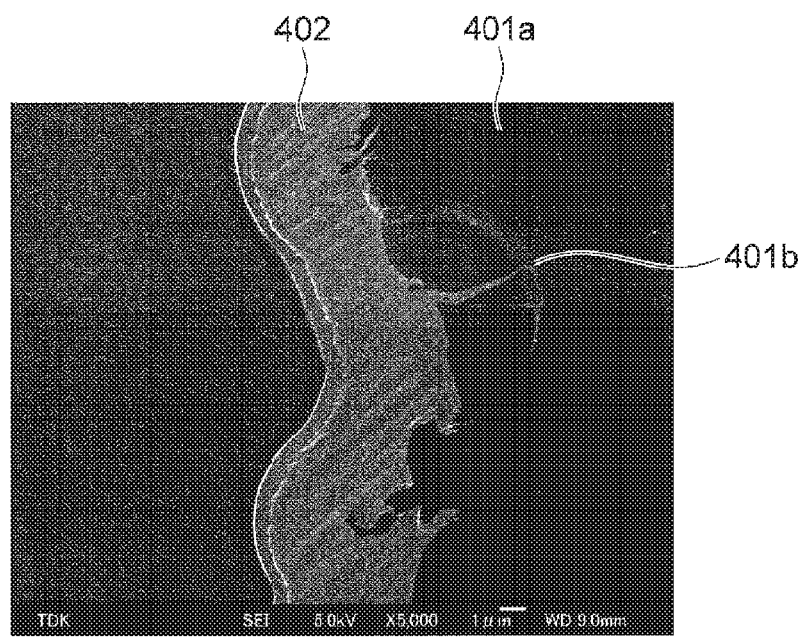
FIG. 4 is a cross sectional image obtained by enlarging an interface between a body portion and a metal plating layer.

FIG. 4 is a cross sectional image obtained by enlarging surfaces of the body portion 401 and the metal plating layer 402. In FIG. 4, a mixture of a carbon fiber 401b and a polyimide resin 401a is adopted in the body portion 401. As illustrated in FIG. 4, if the body portion 401 contains the carbon fiber 401b as the filler, it is preferable for a portion of the carbon fiber 401b to be exposed to an interface with the metal plating layer 402. In a case in which the portion of the carbon fiber 401b as the filler is exposed to the interface with the metal plating layer 402, the metal plating layer 402 is formed in a state in which the metal plating layer 402 enters a gap between the polyimide resin 401a and the carbon fiber 401b of the body portion 401 as illustrated in FIG. 4. Therefore, adhesiveness between the body portion 401 and the metal plating layer 402 is improved.

Figure 5B:
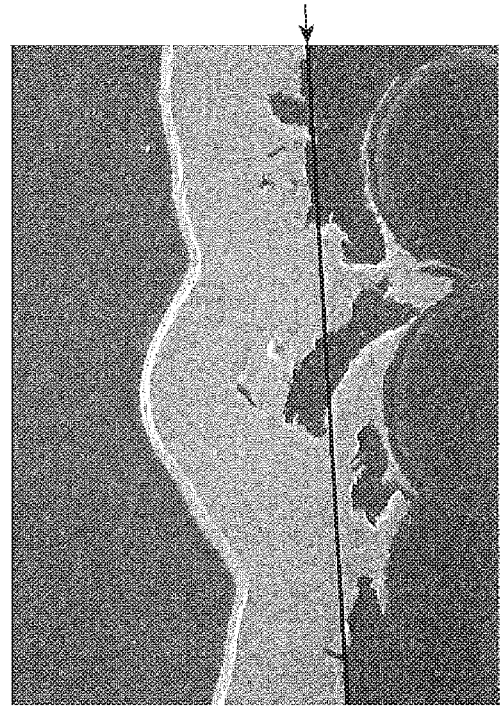
FIG. 5B is a diagram illustrating a method of calculating a length L.
Figure 5A:
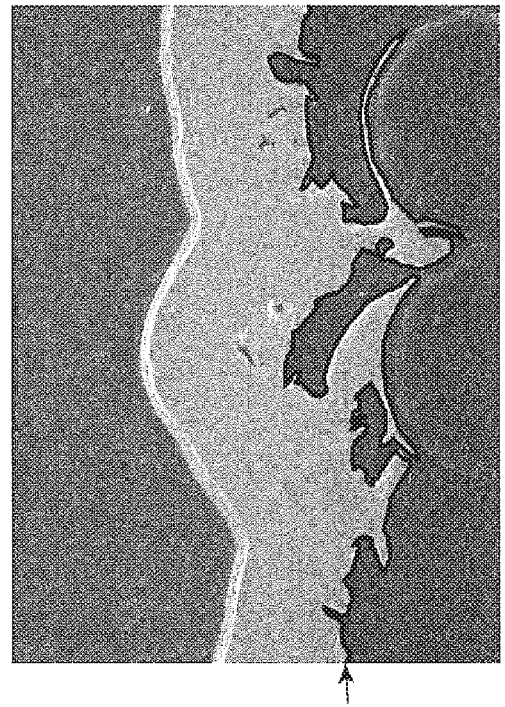
FIG. 5A is a diagram illustrating a method of calculating a length A.

Further, when a length of the surface of the body portion 401 in the cross sectional image is A and a length of the straight line connecting the end portions of the surface of the body portion 401 in the cross sectional image is L, it is preferable for A/L to be in a range of 1.35 to 7.10. A/L can be calculated using the following method. That is, after a section is formed using polishing, a secondary electron image is acquired using a scanning electron microscope (SEM) or the like. Thereafter, if the surface of the body portion 401 is traced using image analysis software (for example, product name: Mac-View, manufactured by MOUNTECH Co.) or the like with respect to the secondary electron image, a line having irregularities as illustrated in FIG. 5A is obtained. This is the length A of the surface of the body portion 401, and a length of this line is A. Then, if the end portions of the surface of the body portion 401 in the cross sectional image are connected by a straight line, a straight line as illustrated in FIG. 5B is obtained. A length of this straight line is L. Accordingly, it is possible to calculate A/L. When A/L is in the range of 1.35 to 7.10, the surface resistance of the spoiler 40 is reduced and adhesiveness between the body portion 401 and the metal plating layer 402 is improved.

The above spoiler 40 can be manufactured using the following method. That is, a process of forming the body portion 401, a process of forming irregularities of the surface of the body portion 401 using a blasting process, and a process of forming a metal plating layer on the surface of the body portion 401 are included.

The process of forming the body portion 401 is not particularly limited as long as the process is a known resin molding method and, for example, injection molding may be used.

A dry blasting process is suitably used as the blasting process used in the process of forming the irregularities of the surface of the body portion 401. The blasting process is a process of improving the adhesiveness between the body portion 401 and the metal plating layer 402. Through the blasting process, the surface is processed so that A/L on the surface of the body portion 401 is in the range of 1.35 to 7.10. In the case of the dry blasting method, it is possible for A/L to be in a desired range by adjusting a particle size of a polishing powder. In a case in which the filler is included in the body portion 401, the filler is exposed to the surface of the body portion 401 by performing the blasting process. Accordingly, the adhesion to the metal plating layer 402 is further improved. Further, in a case in which the filler is formed of, for example, an elongated fibrous material and greatly protrudes from the surface of the body portion 401, the greatly protruding portion can be partially removed through the blasting process.

In the process of forming the metal plating layer, the method thereof is not particularly limited, and a known method such as an electrolytic plating method or an electroless plating method may be used. In a case in which the metal plating layer is formed using the electroless plating method, it is possible to easily form the metal plating layer on the entire surface regardless of a shape of the body portion, and to easily perform control of the thickness. Hereinafter, an example of a method of forming the metal plating layer using the electroless plating will be described.

First, a degreasing treatment for a plating target surface is performed as a pre-treatment. For a degreasing solution, an alkali degreasing solution or an acidic degreasing solution may be used. Suitably, the alkaline degreasing solution is effective to remove grease adhering to the surface of the body portion 401. After the degreasing treatment, washing is performed with purified water.

Then, an alkaline solution treatment is performed on the surface of the body portion 401 in order to adjust the surface of the body portion 401 to a surface to which a catalyst is easily adhered. Thereafter, a pre-dip process is performed in order to remove moisture of the surface of the body portion 401, if necessary.

Then, a catalyst formed of a catalyst core when an electroless plating film is formed is adhered to the surface of the body portion 401. A known material such as copper, a copper-nickel alloy, platinum, silver, or a noble metal such as palladium may be used as the catalyst. The commonly used palladium is preferable. By immersing the surface of the body portion 401 into a catalyst solution containing a noble metal colloid such as palladium and processing the surface, the catalyst can be adhered to the surface. In order to enhance plating deposition due to the palladium catalyst, an adhesion promoting treatment may be further performed. Thereafter, water washing is performed.

Then, electroless plating is performed on the surface of the body portion 401 to which the catalyst has been adhered, to form the metal plating layer 402 formed as an electroless plating film. The electroless plating is not particularly limited, and electroless copper plating, electroless nickel plating, electroless palladium plating, electroless silver plating, electroless gold plating, electroless platinum plating, or the like may be used. An alloy plating using such noble metals may also be used. From the economic point of view and the point of view of workability improvement, the electroless nickel plating (for example, Ni—P plating or Ni—B plating) or the electroless copper plating among these platings is preferable. When the electroless nickel plating (Ni—P plating) is performed, for example, a plating solution containing sulfuric acid-Ni and hypophosphorous acid-Na may be used as a plating solution. These platings may be combined to form a plurality of layers of plating films. In some types of plating, the electroless plating film can be formed by treating the body portion 401 for 20 to 60 minutes using a plating solution usually adjusted to 40 to 90° C.

As described above, in the magnetic disk device 1 according to this embodiment, the spoiler 40 that is a rectifying component for a magnetic disk device includes the body portion 401 made of a resin and the metal plating layer 402 that covers the entire surface of the body portion 401. Accordingly, the surface resistance in the spoiler 40 is reduced, and it is possible to prevent the surface of the spoiler 40 from being charged with positive charge. Therefore, by using the spoiler 40 according to this embodiment, it is possible to prevent the magnetic disk 10 arranged opposite to the spoiler 40 from being charged with negative induction charge. As a result, it is possible to prevent dust (particles) charged with positive charge from adhering to the magnetic disk 10 in the magnetic disk device 1.

In particular, the spoiler 40 according to this embodiment is characterized in that the entire surface thereof is covered with the metal plating layer 402. Accordingly, since the body portion 401 is not exposed to the outside, the choice of a material used in the body portion 401 is widened. With respect to a problem of adhesion of particles in the spoiler made of a resin in the related art, for example, it is possible to also suppress charging of the spoiler by blending a conductive filler with the resin material. However, if an area in which the resin material and the filler are mixed with each other is exposed to the outside (the inside of the device), generation of contaminants due to the filler or the like is a concern. On the other hand, in the spoiler 40 in which the entire surface of the body portion 401 is covered with the metal plating layer 402, since the filer is not exposed to the outside even when the filler is mixed with the resin material, the contaminants or the like may not be a concern.

Therefore, with the spoiler 40 according to this embodiment, it is possible to prevent particles from adhering to the magnetic, disk 10 similar to a metal spoiler, and to realize a low cost while avoiding generation of metal contaminants, similar to the spoiler made of a resin.

Further, when a length of the surface of the body portion 401 in a cross sectional image of the spoiler 40 is A, and a length of a straight line connecting end portions of the surface of the body portion 401 in the cross sectional image is L, A/L is in a range of 1.35 to 7.10. Accordingly, adhesiveness between the body portion 401 and the metal plating layer 402 is improved.

When a resin material is used as a rectifying component for a magnetic disk device such as the spoiler 40, heat resistance is required for use in a high temperature environment. Further, from a point of view of a function of the rectifying component, a resin material having a high coefficient of elasticity is suitably used. However, there is a problem in that such a resin material is generally a hard-to-plate material, and the adhesion is low even when the metal plating layer is formed. Therefore, in a case in which the metal plating layer is shed due to the rotation of the magnetic disk 10, metal contaminants or particles are likely to be generated. For this, in the spoiler 40 according to this embodiment, since the A/L is in the above range, it is possible to greatly improve adhesiveness of the body portion 401 made of a resin and the metal plating layer 402. Accordingly, it is possible to suppress the generation of the metal contaminants or the particles.

Further, since the thickness of the metal plating layer 402 is 0.4 μm to 10.2 μm, it is possible to reduce the surface resistance of the spoiler 40, and the adhesiveness to the body portion 401 and the metal plating layer 402 is improved. In this case, when the hardness of the metal plating layer 402 is 300 HV to 800 HV, it is possible to further improve the above effect.

Further, since the filler is included in the body portion 401 in addition to the resin, strength of the body portion 401 is improved. In this case, since the filler is exposed to the surface of the body portion 401, that is, the interface with the metal plating layer 402 in the body portion 401, the metal plating layer 402 easily enters a gap between irregularities of the surface of the body portion 401, and the adhesiveness of the body portion 401 and the metal plating layer 402 is improved due to an anchor effect.

Further, in the spoiler 40 according to this embodiment, the entire surface of the body portion 401 is covered with the metal plating layer 402, thus this spoiler 40 can be suitably manufactured using an electroless plating method. A method of forming the metal plating layer 402 on the surface of the body portion 401 is not limited to the electroless plating method. For example, in a case in which the metal plating layer 402 is formed on a detailed portion such as the inside of the through hole 43, the electroless plating method is most suitably used and creation of the metal plating layer 402 can be performed more conveniently. Further, since control of a thickness of the metal plating layer 402 can be easily performed according to the electroless plating method, it is possible to manufacture the spoiler 40 capable of preventing particles from adhering to the magnetic disk with higher accuracy.

Figure 6:
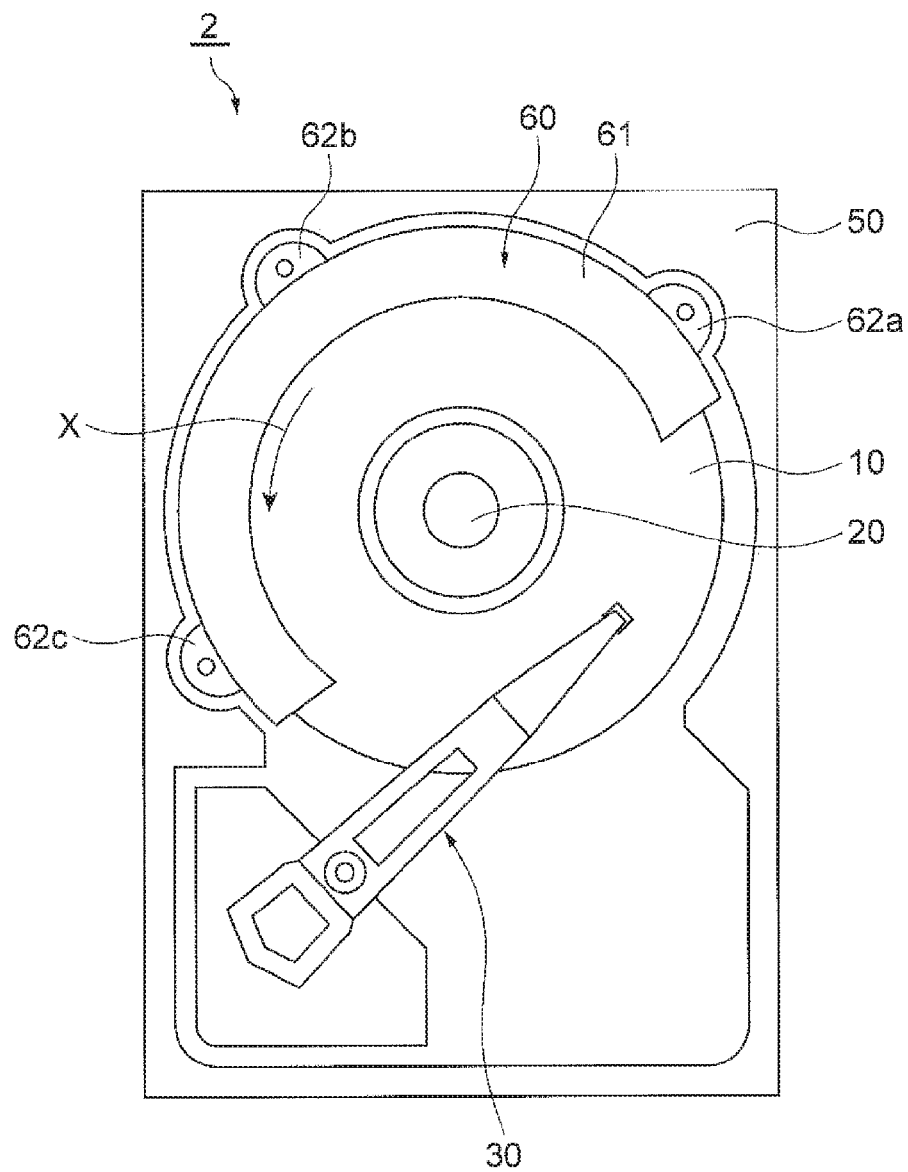
FIG. 6 is a schematic configuration diagram of a magnetic disk device according to a modification example of the present invention.
Figure 7:
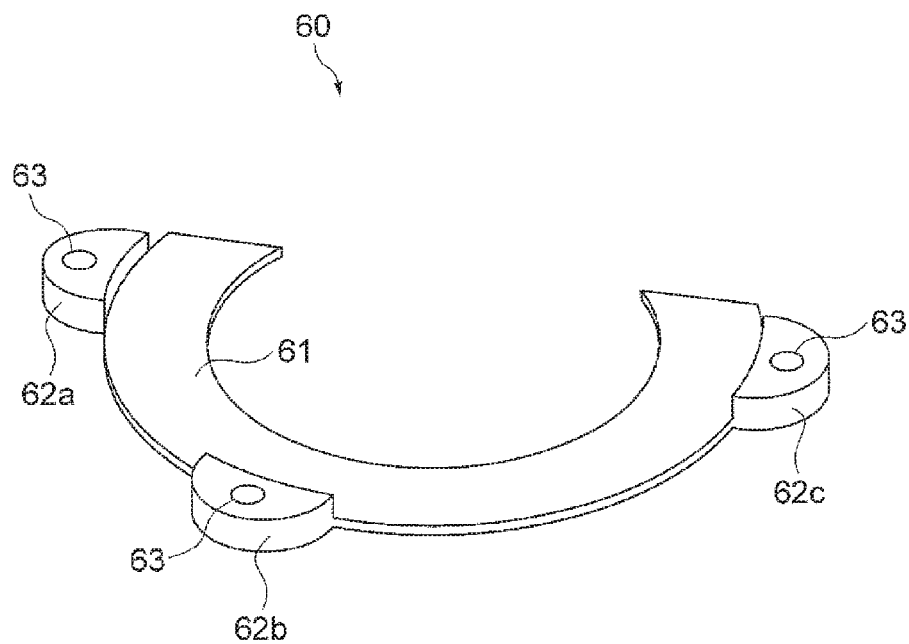
FIG. 7 is a schematic perspective view illustrating a configuration of a disk damper.

Next, a disk damper which is another example of the rectifying component for a magnetic disk device according to this embodiment will be described. FIG. 6 is a schematic configuration diagram of a magnetic disk device according to a modification example. FIG. 7 is a schematic perspective view illustrating a configuration of the disk damper.

Differences between magnetic disk device 2 according to the modification example and the magnetic disk device 1 are the following points. That is, as the rectifying component for a magnetic disk device, a disk damper 60 is included in place of the spoiler 40. The disk damper 60 includes a plate portion 61 inserted between the magnetic disks 10, and a plurality of support portions 62a to 62c that support the plate portion 61.

The plate portion 61 is a flat plate-like member, and has an arc shape having a width along a shape of the magnetic disk 10. The plate portion 61 suppresses an air flow caused by rotation of the magnetic disk 10. Further, the support portions 62a to 62c are provided at a distance on the outer peripheral side of the plate portion 61, and have a thickness (height) greater than that of the plate portion 61. A through hole 63 is provided in each of the support portions 62a to 62c. In the magnetic disk device 2, a shape of the housing 50 is different from that of the magnetic disk device 1, and a space for attaching the disk damper 60 is formed.

When the disk damper 60 is attached, a plurality of disk dampers 60 are prepared so that the disc damper 60 is inserted between a plurality of magnetic disks 10, and the magnetic disk 10 and the disk damper 60 are alternately attached to the housing 50 so that the plurality of disk dampers 60 overlap each other. Then, the disk dampers 60 are fixed to the housing 50 by screw-fixing the through holes 63 provided in the same support portions 62a to 62c of the plurality of disk dampers 60. Accordingly, each disc damper 60 is inserted between the plurality of magnetic disks 10. At least one main surface of the plate portion 61 of the disk damper 60 is arranged to face a main surface of any one of the plurality of magnetic disks 10.

In the above disk damper 60, a configuration in which the entire surface of the body portion made of a resin is covered with the metal plating layer is adopted, similar to the spoiler 40. Accordingly, it is possible to reduce surface resistance of the disk damper 60, and to solve a problem relating to adhesion of particles in the disk damper made of a resin in the related art. Further, since the entire surface of the body portion of the disk damper 60 is covered with the metal plating layer, the filler is not exposed to the outside even when the filler is mixed with the resin material, and accordingly, contaminants or the like may not be a concern. Further, since the adhesion of the metal plating layer itself is improved as compared with a case in which an area of the resin is partially exposed, generation of metal contaminants due to, for example, peeling of the metal plating layer is also suppressed.

Although the embodiments of the present invention have been described above, the present invention is not limited to the above-described embodiments, and can be modified in various ways without departing from the spirit and scope thereof.

For example, the shapes of the spoiler 40 and the disk damper 60 as the rectifying components for a magnetic disk device described in the above embodiment are examples. Therefore, the shapes thereof can be appropriately changed. For example, the number of plate portions 41 in the spoiler 40 is appropriately changed according to the number of magnetic disks 10 used in the magnetic disk device 1. That is, the shape thereof is not particularly limited as long as the rectifying component is a rectifying component for controlling an air flow caused by the rotation of the magnetic disk 10 and includes a plate portion and a support portion.

Example 1

Hereinafter, the present invention will be described in greater detail based on examples and comparative examples, but the present invention is not limited to the following examples.

Preparation of Sample

Example 1

Preparation of Body Portion

By injection-molding a mixture of a polyimide resin and a carbon fiber, a resin molded product was obtained as a body portion of a disk damper. In this case, a percentage of the carbon fiber relative to a total weight of the resin molded product was 30 wt %.

(Formation of Metal Plating Layer)

As a degreasing treatment, the body portion was immersed into a degreasing solution for 5 minutes, and then, washed with purified water. Then, the body portion was immersed into an alkaline aqueous solution for 5 minutes, and then, washed with purified water. Thereafter, as a process of attaching a catalyst to the surface of the body portion, the body portion was immersed in an aqueous solution containing Pd ions for 5 minutes, and then, washed with purified water.

Then, the body portion was immersed into an electroless Ni—P plating solution for 60 minutes, and then, washed with purified water. As a result, the entire surface of the body portion was covered with a metal plating layer formed of Ni—P. By drying the body portion covered with the metal plating layer for 10 minutes at 130° C., a sample of the disk damper according to Example 1 was obtained.

Example 2

A sample of the disk damper according to Example 2 was prepared using the same method as in Example 1 except that the blasting process (dry blasting) was performed on the resin molded product.

Examples 3 to 5

Samples of the disk damper according to Examples 3 to 5 were prepared using the same method as in Example 2 except that the particle size of the polishing powder used in the blasting process was adjusted, unlike Example 1. By adjusting the particle size of the polishing powder, samples of which A/L is different were obtained.

Examples 6 to 9

Samples of the disk damper according to Examples 5 to 8 were prepared using the same method as in Example 2 except that the plating time was adjusted. That is, the particle size of the polishing powder used in the blasting process was the same as in Example 2. By adjusting the plating time, samples of which the thicknesses of the metal plating layers were different were obtained.

Comparative Example 1

A resin molded product obtained by injection molding was used as a sample of a disk damper according to Comparative Example 1. The blasting process was not performed on the sample of Comparative Example 1.

<Observation and Evaluation of Sample>

(A/L)

After a section of the obtained sample was formed by polishing, a secondary electron image of the section was captured at a viewing magnification of 5000× using a field emission scanning electron microscope (FE-SEM) (Model: JSM-6700F, manufactured by JEOL Ltd.). In the secondary electron image of the sample section, the surface of the body portion in the sample was traced and a length A of the body surface of the sample was measured using image analysis software (product name: Mac-View, manufactured by MOUNTECH Co.). Similarly, a length L of a straight line connecting both end portions of the surface of the body portion of the image was measured using the image analysis software (product name: Mac-View, manufactured by MOUNTECH Co.). A/L was calculated based on results of the measurements.

(Thickness of Metal Plating Layer)

A thickness of the metal plating layer was measured by a fluorescent X-ray analysis apparatus or the like.

(Surface Resistance Measurement)

The surface resistance in the metal plating layer of the sample was measured. The measurement was performed using a resistivity meter in a four-point probe method. For a result of the measurement, the surface resistance was evaluated based on a rank of three levels below.

Rank A: less than $1.0 \times 10^{-1}$
Rank B: $1.0 \times 10^{-1}$ or more and less than $1.0 \times 10^2$
Rank C: $1.0 \times 10^2$ or more (Cross-Cut Test)

The adhesion of the metal plating layer in the sample was evaluated based on a cross-cut test. Specifically, the test was performed in the following procedure according to JIS K5600-5-6 and the evaluation was performed.

(1) First, a blade was set to be perpendicular to a surface of the sample and six cuts were performed.

(2) A direction was changed by 90° and six orthogonal cuts were performed.

(3) A tape having a width of 25 mm and a length of 75 mm was pasted to a cut portion in the metal plating layer, and the tape is thinly rubbed with a finger so that the metal plating layer is able to be seen.

(4) The tape was peeled for 0.5 to 1.0 seconds at an angle close to 60° within 5 minutes after the pasting.

(5) A surface state of the metal plating layer after the tape peeling, that is, a peeling state of the metal plating layer was visually confirmed.

Based on the above cross-cut test, the adhesion of the metal plating layer to the body portion in the sample was evaluated. The adhesion was evaluated based on a rank of five levels below. The metal plating layer evaluated as Ranks 1 to 3 can be determined to have excellent adhesion. Since the metal plating layers of Rank 4 or 5 have poor adhesion, it can be determined not to be suitable for practical use as the rectifying component.

Rank 1: A protective film was slightly peeled at a cutting intersection. A peeling rate is 5% or less.

Rank 2: The protective film is peeled along a cut edge and/or the intersection. The Peeling rate is more than 5% and 15% or less.

Rank 3: The protective film is greatly peeled along the cut edge partially or entirely, and/or various portions of a square are peeled partially or entirely. The peeling rate is more than 15% and 35% or less.

Rank 4: The protective film is greatly peeled along the cut edge partially or entirely, and/or several squares are peeled partially or entirely. The peeling rate is more than 35% and 65% or less.

Rank 5: The peeling rate is higher than that in Rank 4.

The "peeling rate" is a percentage of an area of "peeling" relative to an area of the entire square. The area of "peeling" is a sum of areas of portions of which the protective film is peeled off in the form of a lattice.

The measurement results and the evaluation results are shown in Table 1 and Table 2.

It was confirmed from the results in Table 1 that, in Examples 1 to 5 in which the metal plating layer was formed on the entire surface, the surface resistance was reduced, unlike Comparative Example 1. It was also confirmed that, in Examples 2 to 4 in which A/L is in a range of 1.35 to 7.01, particularly, the surface resistance was low and the adhesion was good.

Further, it was confirmed from the result in Table 2 that, in Examples 2, 7, and 8 in which the thickness of the metal plating layer was in a range of 0.48 µm to 10.11 µm, the surface resistance was low and the adhesion was good.

TABLE 1

| Sample | A/L | Thickness of metal plating layer (µm) | Surface resistance (Ω/□) | Evaluation item | Cross-cut test |
|---|---|---|---|---|---|
| Comparative Example 1 | 1.09 | 0.0 | $1.98 \times 10^{12}$ | C | — |
| Example 1 | 1.10 | 5.4 | $2.12 \times 10^{-2}$ | A | 5 |
| Example 2 | 1.35 | 5.4 | $2.27 \times 10^{-2}$ | A | 1 |
| Example 3 | 3.20 | 5.4 | $2.30 \times 10^{-2}$ | A | 1 |
| Example 4 | 7.01 | 5.3 | $2.48 \times 10^{-2}$ | A | 1 |
| Example 5 | 7.20 | 5.2 | $2.50 \times 10^{-2}$ | A | 3 |

TABLE 2

| Sample | A/L | Thickness of metal plating layer (µm) | Surface resistance (Ω/□) | Evaluation item | Cross-cut test |
|---|---|---|---|---|---|
| Example 6 | 3.12 | 0.3 | $1.20 \times 10^{1}$ | B | 1 |
| Example 7 | 3.17 | 0.5 | $6.60 \times 10^{-1}$ | A | 1 |
| Example 3 | 3.20 | 5.4 | $2.30 \times 10^{-2}$ | A | 1 |
| Example 8 | 3.09 | 10.1 | $1.00 \times 10^{-2}$ | A | 1 |
| Example 9 | 3.04 | 11.3 | $8.59 \times 10^{-3}$ | A | 3 |

What is claimed is:

1. A rectifying component for a magnetic disk device including a flat plate-like plate portion arranged to face a magnetic disk, and a support portion that supports the plate portion, the rectifying component comprising:
    a body portion made of a resin; and
    a metal plating layer that covers an entire surface of the body portion,
    wherein the body portion includes a filler, and
    the filler is exposed to an interface between the body portion and the metal plating layer.

2. The rectifying component for a magnetic disk device according to claim 1,
    wherein when a length of a surface of the body portion in a cross sectional image is A and a length of a straight line connecting end portions of the surface of the body portion in the cross sectional image is L, A/L is 1.35 to 7.10.

3. The rectifying component for a magnetic disk device according to claim 1,
    wherein a thickness of the metal plating layer is 0.4 µm to 10.2 µm.

4. The rectifying component for a magnetic disk device according to claim 3,
    wherein hardness of the metal plating layer is 300 HV to 800 HV.

5. The rectifying component for a magnetic disk device according to claim 1,
    wherein the metal plating layer is formed using an electroless plating method.

* * * * *